United States Patent [19]
Nolte et al.

[11] Patent Number: 5,766,770
[45] Date of Patent: Jun. 16, 1998

[54] FIRE RESISTANT GLASS STRUCTURE

[75] Inventors: Hans-Henning Nolte; Helga Grünzel, both of Gelsenkirchen; Bernd Harbecke, Bochum, all of Germany

[73] Assignee: Flachglas AG, Furth, Germany

[21] Appl. No.: 537,326

[22] Filed: Sep. 29, 1995

[30] Foreign Application Priority Data

Oct. 7, 1994 [DE] Germany .................. 44 35 841.5

[51] Int. Cl.[6] .................................................. B32B 17/00
[52] U.S. Cl. ............... 428/428; 428/432; 428/446; 428/701; 428/702; 428/921
[58] Field of Search ................ 428/428, 432, 428/446, 701, 702, 921; 52/232, 786.1, 786.11

[56] References Cited

U.S. PATENT DOCUMENTS

| | | | |
|---|---|---|---|
| 4,304,052 | 12/1981 | Nolte | 428/921 |
| 4,444,825 | 4/1984 | Vanderstukken | 428/921 |
| 4,451,312 | 5/1984 | Nolte | 428/921 |
| 4,521,333 | 6/1985 | Graham | 428/921 |
| 4,626,301 | 12/1986 | Nolte | 428/921 |
| 4,873,146 | 10/1989 | Toussaint | 428/921 |
| 5,434,006 | 7/1995 | Goelff | 428/921 |
| 5,565,273 | 10/1996 | Egli | 428/426 |

FOREIGN PATENT DOCUMENTS

| | | |
|---|---|---|
| 1 900 054 | 8/1970 | Germany . |
| 28 33 385 | 2/1980 | Germany . |

*Primary Examiner*—Timothy M. Speer
*Attorney, Agent, or Firm*—Herbert Dubno

[57] ABSTRACT

A fire resistant glass structure in which the intervening layer between the panes has a portion of its polyhydric organic compounds replaced by potassium water glass in a layer which consists primarily of sodium water glass. The replacement eliminates ultraviolet light sensitivity without reduction in the increase in the duration of fire resistance provided by the organic compound.

9 Claims, 1 Drawing Sheet

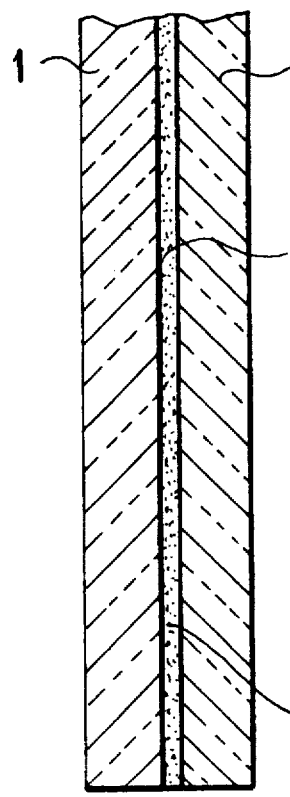
Na WATERGLASS +
K WATERGLASS +
POLYOL/SUGAR ORGANIC
COMPONENT
METALLO-ORGANIC COMPONENT } OPTIONAL
+
Si, Ti, Al, Zr COMPOUNDS

FIRE RESISTANT GLASS STRUCTURE

FIELD OF THE INVENTION

The present invention relates to a fire resistant glass structure or unit which consists of two panes and a fire resistant layer between them. i.e. a layer bridging the space between the panes and which assists in resisting transfer of the fire condition from the fire side to the opposite side of the structure.

BACKGROUND OF THE INVENTION

Fire resistant glass structures of the aforedescribed type generally have, at the fire side, a glass pane, the other pane being composed of glass or another material, for example, a synthetic resin or plastic which is transparent or translucent. In the space between the insulating or fire side glass pane and the pane provided on the opposite side, an intervening layer is provided which, in the case of exposure of the structure to fire, foams. In the past this intervening layer has consisted principally of sodium water glass and water. To increase the duration of fire resistance, organic substances have been added to the intervening layer, generally in the form of polyhydric compounds, the term "polyhydric" being here used to denote organic compounds having two or more hydroxy groups. These compounds can also be referred to as polyvalent alcohols and include the glycols, glycerine and its derivatives and the sugars. The polyhydric compounds can be used individually or in mixtures or combinations.

Fire resistant glass structure in accordance with these principles can have more than two panes and more than one intervening layer. In all cases, however, the intervening layer consisted mainly of sodium water glass. Sodium water glass, also known as sodium silicate, in solid form may consist of $Na_2SiO_3$, $Na_6Si_2O_7$ and $NA_2Si_3O_7$ with variable amounts of water of hydration. The sodium water glass and solution usually contains about 40% $Na_2Si_3O_7$ and such solutions may contain varying ratios of $Na_2O$ to $SiO_2$.

The potassium water glass, of course, consists of the corresponding potassium compounds.

The organic additive for increasing the duration of fire resistance can be present in an amount of 0.5 to 40 weight % in the intervening layer in the prior art systems and fire resistant glass structures of the type with which the invention is concerned can be utilized as or in partitions, fascade coverings and in other building applications where there is a fire danger.

The water glass in the intervening layer is a glass like solid formed by fusing together $Na_2CO_3$, $Na_2O$ or NAOH and $SiO_2$ or $K_2O$, $K_2CO_3$ or KOH and $SiO_2$, depending upon whether the sodium water glass or the potassium water glass is involved. In general, the potassium water glass can be formed by fusing water-free potash and quartz sand or potassium carbonate and quartz sand. The sodium water glass can also be formed from soda and sand by fusion. In all cases, the solidified melt can be comminuted to produce the solid water glass which is commercially available. Water glass solutions which are also known as liquid water glass can be prepared by dissolving the solid water glass under pressure in water and filtering insoluble components therefrom. The production of fire resistant glass units of the aforedescribed type is carried out utilizing the corresponding solutions which can be applied to the glass panes with excess water being evaporated therefrom.

During exposure to fire, as a result of the heat and flames, the intervening layer of alkali silicate, as a result of boiling of the hydration water, expands to form a foam, resisting heat transfer across the intervening layer and thereby providing the fire resistance function.

The invention is an improvement upon such fire resistant glass units in which the intervening layer is a solid water-containing alkali silicate which itself can include 10 to 40% by weight water. The thickness of the intervening layer can be between 0.3 mm and 5 mm (see DE-AS 19 00 054), such fire resistant glass units having proven to be highly effective. In practice the organic additives for prolonging the fire retardant duration have been, for example, ethylene glycol, sorbitol or glycerine and a variety of kinds of sugars or mixtures thereof. One problem with such systems, however, is that the fire resistant glass unit is sensitive with respect to ultraviolet light. Ultraviolet light impinging upon the intervening layer tends to cause a decomposition therein resulting in very fine bubble formation in the intervening layer and hence a clouding of the unit.

OBJECTS OF THE INVENTION

It is, therefore, the principal object of the present invention to provide an improved fire resistant glass structure of the type described whereby the problem of ultraviolet light sensitivity is obviated.

Another object of the invention is to provide a method of eliminating the ultraviolet light sensitivity of a fire resistant glass structure without detriment to the advantageous properties thereof, i.e. without a reduction in the duration of fire resistance, etc.

Still another object of this invention is to provide an improved fire resistant glass structure which is free from drawbacks of prior art systems.

SUMMARY OF THE INVENTION

These objects and others which will become apparent hereinafter are attained, in accordance with the invention, by substituting for a portion of the organic additive a substantially equivalent quantity of potassium water glass which, we have found most surprisingly, reduces or eliminates the ultraviolet light sensitivity of the structure without detrimentally affecting the duration of resistance to fire.

The intervening layer, apart from sodium water glass which constitutes the basic material of this layer, then includes the remainder of organic additive in the form of polyhydric compounds (polyvalent alcohols and/or sugars) and the potassium water glass. It is indeed surprisingly surprising that a replacement of the additive being an equivalent amount of potassium water glass will not reduce the duration of fire resistance but is capable of completely eliminating the ultraviolet light sensitivity. The relative amounts of the potassium water glass and the organic additive usually will depend upon the thickness of the intervening layer and the optical characteristics of the fire resistant structure and can be determined experimentally without difficulty.

Indeed, DE 28 33 385 describes a fire resistant glass with an intervening layer consisting of a mixture of sodium water glass and potassium water glass, but without the organic additive to increase the duration of fire resistance. As a consequence, there is no replacement by potassium water glass of any part of the organic compound. Nor is there any indication in this reference as to the ultraviolet light sensitivity of the system.

According to the invention, a fire resistant glass structure can comprise:

A fire-resistant glass structure having a fire side and a side opposite the fire side, the fire-resistant glass structure comprising:

a first pane of glass on the fire side of the structure;

a second pane on the side opposite the fire side and spaced from the first pane; and an intervening layer between the panes composed in major part of sodium waterglass to which an organic component is admixed, the organic component consisting of polyhydric organic compounds, and an amount of potassium waterglass sufficient to substantially eliminate ultraviolet light sensitivity of the intervening layer.

It has been found to be advantageous to introduce submicroscopic particles of at least one inorganic compound of Si, Al, Ti or Zr for increasing viscosity of said layer upon foaming thereof in a case of exposure of the structure to fire.

The intervening layer can include at least one metallo-organic compound of Si, Al, Ti or Zr for increasing viscosity of said layer upon foaming thereof in a case of exposure of the structure to fire.

The metallo-organic compounds can be preferably a chelate. The inorganic compound can be an oxide, halide, nitrate, sulfate or phosphate of the respective element.

In a preferred embodiment of the invention, the intervening layer contains less than 6% by weight of the organic compound.

In practice it has been found to be advantageous to use a system wherein the potassium waterglass is present in an amount of 2.5 to 7 percent by weight of the intervening layer, the organic component is present in an amount of 1.0 to 7.5 percent by weight of the intervening layer, the intervening layer contains 0 to 15 percent by weight of submicroscopic particles of at least one inorganic compound of Si, Al, Ti or Zr for increasing viscosity of the layer upon foaming thereof in a case of exposure of the structure to fire, and the intervening layer contains 0 to 15 percent by weight of at least one metallo-organic compound of Si, Al, Ti or Zr for increasing viscosity of the layer upon foaming thereof in a case of exposure of the structure to fire.

When the submicroscopic particles or the metallo-organic compound is used, a minimum of 5% by weight thereof should be present.

The invention also comprises a method of limiting ultraviolet light sensitivity of the fire resistant glass structure by replacing the organic component in part by the potassium water glass.

BRIEF DESCRIPTION OF THE DRAWING

The above and other objects, features, and advantages will become more readily apparent from the following description, reference being made to the sole FIGURE of the drawing of which is a cross sectional view of a fire resistant structure in accordance with the present invention.

SPECIFIC DESCRIPTION AND EXAMPLE

In the sole FIGURE of the drawing I have shown a glass pane 2 turned toward the fire side of the structure to be protected and spaced from another glass pane 1 on the opposite side of the composite glass structure, the pane 1 being also composed of glass here but replaceable with a synthetic resin pane. The intervening layer 3 between the pane consisting primarily of sodium water glass and the polyhydric organic compound which in accordance with the invention is partially replaced by potassium water glass.

SPECIFIC EXAMPLE

To determine the characteristics of fire resistant glass structures in dependence upon the compositions of their intervening layers, alkali silicate solutions of different compositions are used and, with otherwise identical structures of the fire resistant unit and identical quantities of the compositions, the respective units were constructed and tested for:

Surface quality following the drying of the alkali silicate layer.

Ultraviolet stability.

Fire resistance in accordance with standards "F" and "G" of German Industrial Standard 4102.

The composition of the solutions before drying is given in weight % and the duration of resistance in the fire tests according to "F" and "G" in minutes:

| Mixture 1: | Quality Surface: | Very Poor |
|---|---|---|
| Sodium Water Glass | UV Stability | Not Determinable |
| without Additives | F Resistance | 28 Min. |
| 65% Water | G Resistance | 32 Min. |
| Mixture 2 | Quality Surface | Good |
| Sodium Water Glass | UV Stability | Poor |
| without additives | F Resistance | 38 Min. |
| 6.5% glycerine | G Resistance | 45 Min. |
| Mixture 3 | Quality Surface | Good |
| Potassium Water Glass | UV Stability | Good |
|  | F Resistance | 28 Min. |
|  | G Resistance | 35 Min. |
| Mixture 4 | Quality Surface | Good |
| 10% Suspension Microscopic | UV Stability | Good |
| Particles of Inorganic $SiO_2$ | F Resistance | 38 Min. |
| Compounds | G Resistance | 104 Min. |

It is especially surprising with Mixture 4 that the "G" duration does not return to that of Mixture 2 but is much greater. It is also surprising that the replacement of much of the organic glycerine by the inorganic potassium water glass not only limits the UV sensitivity but also improves the surface quality of the dry layer.

The UV sensitivity was determined by radiation of the respectively structure with an Ultra-Vitalux lamp at a distance of 1 meter from the text structure with the time to development of bubbles in the layer being measured.

We claim:

1. A fire-resistant glass structure having a fire side and a side opposite the fire side, said fire-resistant glass structure comprising:

a first pane of glass on said fire side of said structure;

a second pane on said side opposite said fire side and spaced from said first pane; and a dried intervening layer between said panes of sodium waterglass to which an organic component is admixed, said organic component consisting of polyhydric organic compounds, and an amount of potassium waterglass sufficient to reduce ultraviolet light sensitivity of said intervening layer.

2. The fire-resistant glass structure defined in claim 1 wherein said intervening layer further comprises submicroscopic particles of at least one inorganic compound of Si, Al, Ti or Zr for increasing viscosity of said layer upon foaming thereof in a case of exposure of the structure to fire.

3. The fire-resistant glass structure defined in claim 1 wherein said intervening layer further comprises at least one metallo-organic compound of Si, Al, Ti or Zr for increasing viscosity of said layer upon foaming thereof in a case of exposure of the structure to fire.

4. The fire-resistant glass structure defined in claim 3 wherein said metallo-organic compound is a chelate.

5. A fire-resistant glass structure having a fire side and a side opposite the fire side, said fire-resistant glass structure comprising:

- a first pane of glass on said fire side of said structure;
- a second pane on said side opposite said fire side and spaced from said first pane; and
- a dried intervening layer between said panes of sodium waterglass to which an organic component is admixed, said organic component consisting of polyhydric organic compounds, and an amount of potassium waterglass sufficient to reduce ultraviolet light sensitivity of said intervening layer, said intervening layer containing less than 6 percent by weight of said organic component.

6. The fire-resistant glass structure defined in claim 5 wherein said intervening layer further comprises submicroscopic particles of at least one inorganic compound of Si, Al, Ti or Zr for increasing viscosity of said layer upon foaming thereof in a case of exposure of the structure to fire.

7. The fire-resistant glass structure defined in claim 5 wherein said intervening layer further comprises at least one metallo-organic compound of Si, Al, Ti or Zr for increasing viscosity of said layer upon foaming thereof in a case of exposure of the structure to fire.

8. The fire-resistant glass structure defined in claim 5 wherein said metallo-organic compound is a chelate.

9. The fire-resistant glass structure defined in claim 5 wherein said organic component is a glycol, glycerine, or a sugar.

* * * * *